Patented Dec. 12, 1933

1,939,416

UNITED STATES PATENT OFFICE 1,939,416

ORTHO-AMINOARYL-ALKYLSULFONES AND ORTHO-AMINOARYL-ARALKYLSULFONES

Kurt Schimmelschmidt and Hans Thomae, Frankfort-on-the-Main-Hochst, Germany, assignors to General Aniline Works, Inc., New York, N. Y., a corporation of Delaware No Drawing. Application January 23, 1933 Serial No. 653,178, and in Germany August 24, 1932

8 Claims. (Cl. 260—130.5)

The present invention relates to new ortho-aminoaryl-alkylsulfones and ortho-aminoaryl-aralkylsulfones, more particularly it relates to compounds of the following general formula:

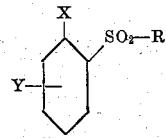

wherein X stands for the nitro or amino group, Y stands for halogen, nitro, alkyl, alkoxy, the trifluoromethyl or sulfonic acid-dialkylamino group and R stands for alkyl or aralkyl.

It is known that aryl-alkylsulfones may be prepared from α-(arylsulfonyl)-fatty acids by splitting off the carboxyl group. This may be achieved by heating in an aqueous solution in the presence of strong alkalies or in a melt at 160° C. In applying this process to ortho-nitro-derivatives, great difficulties are encountered when working on an industrial scale.

By heating, for instance, ortho-nitrophenyl-sulfonyl-acetic acid in an aqueous solution in the presence of strong alkalies dark colored solutions are obtained. The undesired compounds contained therein are formed by the mutual action between the nitro group and the sulfonyl-acetic acid group, standing in ortho-position to each other, probably with formation of nitrophenols or reduction products (compare, for instance, "Berichte der Deutschen chemischen Gesellschaft", 45, page 750 (1912)). By heating ortho-nitrophenyl-sulfonyl-acetic acid in the dry state to 160° C., ortho-nitrophenyl-methyl-sulfone is obtained in a smooth reaction, but when working on a commercial scale the apparatus used is strongly corroded in consequence of the acid nature of the parent material. Moreover, the process is not economic since the ortho-nitrophenyl-sulfonylacetic acid must be isolated, by acidification and filtration with suction, from the aqueous solution of its sodium salt obtained by oxidation of the ortho-nitrophenyl-thioglycolic acid, and the isolated product must be dried. It is also possible to transform α-(ortho-nitroaryl-sulfonyl)-fatty acids directly in an aqueous solution into ortho-nitroaryl-alkylsulfones by boiling for a prolonged time, but in this case also the apparatus is corroded by the solution, which at the beginning is strongly acid.

We have found that α-(ortho-nitroaryl-sulfonyl)-fatty acids, α-(ortho-nitroaryl-sulfonyl)-aryl fatty acids and their substitution products may be transformed with a good yield into ortho-nitroaryl-alkylsulfones, ortho-nitro-aryl-aralkyl-sulfones and their substitution products by heating the alkali metals salts of the acids in an aqueous, feebly alkaline solution, whereby the above mentioned disadvantages are avoided. This result could in no way be foreseen; it was rather to be expected that also in the case of a weakly alkaline solution the by-reactions would occur which are in general observed when the nitro-group is in ortho-position. Another advantage of the present process resides in the fact that the carboxyl group is split off much more quickly than in an acid solution, whereby a very favorable yield per unit of space and time is obtained.

The process can be rendered still more economic if the solution of α-(ortho-nitroaryl-sulfonyl) fatty acid or α-(ortho-nitroaryl-sulfonyl)-aryl-fatty acid, obtainable by oxidation of the α-(ortho-nitroaryl-mercapto)-fatty acid or α-(ortho-nitroaryl-mercapto)-aryl-fatty acid in a solution of alkali bicarbonate, is heated without isolating the said compound therefrom, if desired after removal of too great an excess of alkali bicarbonate.

By reduction of the ortho-nitroaryl-alkylsulfones, ortho-nitroaryl-aralkylsulfones and their substitution products, which by the present invention are easily obtainable on an industrial scale, ortho-aminoaryl-alkylsulfones, ortho-amino-aryl-aralkylsulfones and their substitution products are obtained; these are valuable intermediate products for the manufacture of dyestuffs. The present invention, therefore, represents a valuable addition to the art.

The following examples serve to illustrate the invention, but they are not intended to limit it thereto, the parts being by weight:

(1) 280 parts of 4-chloro-2-nitrophenyl-sulfonylacetic acid are dissolved with 63 parts of anhydrous sodium carbonate in 700 parts of water and the whole is heated in a reflux apparatus for 1 hour. After cooling, the crystalline product which has been precipitated, is isolated from the liquor by filtering with suction. There is obtained in a good yield 4-chloro-2-nitrophenyl-methylsulfone melting at 155° C.–156° C. By reducing it by one of the usual methods there is obtained 4-chloro-2-aminophenyl-methylsulfone melting at 87° C.–88° C.

(2) A suspension of 270 parts of the sodium salt of 4-chloro-2-nitrophenylthioglycollic acid in 10 times their weight of water is oxidized at 20° C.–28° C. by introduction in small portions of about 240 parts of potassium permanganate and simultaneous introduction of carbon dioxide. The oxidation is finished when the violet coloration produced by the permanganate does not change within ½ hour. The excess of potassium permanganate is removed by addition of a small quantity of sodium-bisulfite solution and the solution is filtered by suction from the oxides of manganese which have been precipitated. The clear solution of 4-chloro-2-nitrophenyl-sulfonylacetic acid thus obtained is boiled for 1 hour in a reflux apparatus and worked up as described in Example 1. There is obtained in good yield 4-chloro-2-nitrophenyl-methylsulfone melting at 155° C.–156° C.

(3) 313 parts of 4-trifluoromethyl-2-nitrophenyl-sulfonylacetic acid melting at 156° C.–157° C. are dissolved with 63 parts of anhydrous sodium carbonate in 700 parts of water and the whole is heated in a reflux apparatus. The new product separates in a crystalline state during the heating. After the reaction is complete, the whole is allowed to cool, the solid matter is filtered with suction and dried. There is obtained with a good yield 4-trifluoromethyl-2-nitrophenyl-methylsulfone melting at 150° C.–151° C.

By reducing the said sulfone by one of the usual methods, there is obtained 4-trifluoromethyl-2-aminophenyl-methylsulfone melting at 94° C.–95° C.

(4) 355.5 parts of α-(4-chloro-2-nitrophenyl-sulfonyl)-phenylacetic acid are dissolved with 63 parts of anhydrous sodium carbonate in 4000 parts of water and the whole is heated to boiling. Even before the boiling point is attained, part of the new product separates in a crystalline form; the reaction is then quickly finished by boiling. After cooling, the whole is filtered by suction and the product is washed with water until neutral. There is obtained in a good yield the 4-chloro-2-nitro-phenyl-benzylsulfone, melting at 112° C.–113° C., which may be reduced in the usual manner into the 4-chloro-2-aminophenyl-benzylsulfone, melting at 132° C.–133° C.

In an analogous manner there may be obtained from 2-nitrophenyl-sulfonylacetic acid, melting at 170° C.–171° C., 2-nitrophenyl-methylsulfone, melting at 106° C.–107° C., and 2-aminophenyl-methylsulfone, melting at 84° C.–85° C.; from α-(2-nitrophenyl-sulfonyl)-propionic acid, melting at 126° C.–128° C., 2-nitrophenyl-ethylsulfone, melting at 44° C.–45° C., and 2-aminophenyl-ethylsulfone, melting at 74° C.–75° C.; and from α-(4-chloro-2-nitrophenyl-sulfonyl)-n-butyric acid, melting at 88° C.–90° C., 4-chloro-2-nitrophenyl-n-propylsulfone, melting at 73° C.–74° C., and 4-chloro-2-aminophenyl-n-propylsulfone melting at 54° C.–55° C.

The following table indicates a number of other nitro-compounds and bases obtainable according to the present invention:—

2-nitrophenyl-benzylsulfone melting at 127° C.–128° C.
2-aminophenyl-benzylsulfone melting at 156° C.
2-aminophenyl-n-butylsulfone melting at 45° C.–47°C.
2-aminophenyl-cyclohexylsulfone melting at 128° C.–130° C.
4-chloro-2-nitrophenyl-ethylsulfone melting at 123° C.–125° C.
4-chloro-2-aminophenyl-ethylsulfone melting at 87° C.–89° C.
4-chloro-2-aminophenyl-n-butylsulfone being an oil, boiling at 225° C.–226° C. under a pressure of 8 mm Hg.
5-chloro-2-aminophenyl-methylsulfone melting at 121° C.–123° C.
2-aminonaphthyl-1-methylsulfone melting at 140° C.–141° C.
4-methyl-2-nitrophenyl-methylsulfone melting at 122° C.–124° C.
4-methyl-2-aminophenyl-methylsulfone melting at 105° C.–106° C.
4-methyl-2-nitrophenyl-ethylsulfone melting at 88° C.–89° C.
4-methyl-2-aminophenyl-ethylsulfone melting at 102° C.
4-methyl-2-aminophenyl-n-butylsulfone melting at 37° C.–39° C.
4-methyl-2-nitrophenyl-benzylsulfone melting at 134° C.–136° C.
4-methyl-2-aminophenyl-benzylsulfone melting at 135°C.–136° C.
5-methoxy-2-aminophenyl-methylsulfone melting at 100° C.–102° C.
4-nitro-2-aminophenyl-methylsulfone melting at 199° C.–200° C.
5-nitro-2-aminophenyl-methylsulfone melting at 203° C.–204° C.
4-trifluoromethyl-2-nitrophenyl-ethylsulfone melting at 116° C.–118° C.
4-trifluoromethyl-2-aminophenyl-ethylsulfone melting at 42° C.–43° C.
4-trifluoromethyl-2-nitrophenyl-benzylsulfone melting at 134°C.–135° C.
4-trifluoromethyl-2-aminophenyl-benzylsulfone melting at 193° C.–195° C.
3-nitro-4-methylsulfonyl-benzene-sulfonic acid - dimethyl - amide melting at 176° C.–177° C.
3-amino-4-methylsulfonyl-benzene-sulfonic acid - dimethyl-amide melting at 187° C.–188° C.
4-chloro-2-nitrophenyl-(4'-methylbenzyl)-sulfone melting at 133° C.–134° C.
4-chloro-2-aminophenyl-(4'methylbenzyl)-sulfone melting at 119° C.–120° C.
2-nitrophenyl-(4'-methylbenzyl)-sulfone melting at 163° C.–164° C.
2-aminophenyl-(4'-methylbenzyl)-sulfone melting at 163° C.
2-nitrophenyl-(3.4'-dichlorobenzyl)-sulfone melting at 148° C.–149° C.
2-aminophenyl-(3',4'-dichlorobenzyl)-sulfone melting at 150° C.

We claim:

1. The compounds of the following general formula:

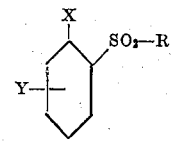

wherein X stands for the nitro or amino group, Y stands for halogen, nitro, alkyl, alkoxy, the trifluoromethyl or sulfonic acid-dialkylamino group and R stands for alkyl or aralkyl, representing colorless, partly solid, partly fluid compounds which are valuable intermediates for the production of dyestuffs.

2. The compounds of the following general formula:

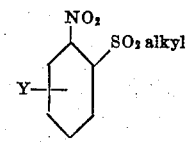

wherein Y stands for chlorine, nitro, methyl, methoxy, the trifluoromethyl or sulfonic acid-dimethylamino group, representing colorless, partly solid, partly fluid compounds which are valuable intermediates for the production of dyestuffs.

3. The compounds of the following general formula:

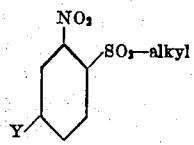

wherein Y stands for chlorine or the trifluoromethyl group, representing colorless, partly solid, partly fluid compounds which are valuable intermediates for the production of dyestuffs.

4. The compounds of the following general formula:

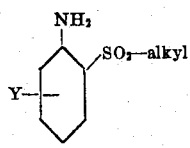

wherein Y stands for chlorine, nitro, methyl, methoxy, the trifluoromethyl or sulfonic acid-dimethylamino group, representing colorless, partly solid, partly fluid compounds which are valuable intermediates for the production of dyestuffs.

5. The compounds of the following general formula:

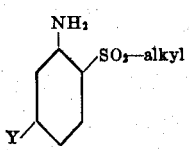

wherein Y stands for chlorine or the trifluoromethyl group, representing colorless, partly solid, partly fluid compounds which are valuable intermediates for the production of dyestuffs.

6. The compound of the following formula:

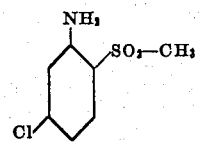

representing a colorless crystallized compound which melts at 87° C.–88° C. and which is a valuable intermediate for the production of dyestuffs.

7. The compound of the following formula:

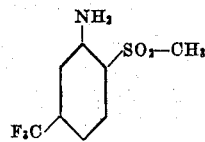

representing a colorless crystallized compound which melts at 94° C.–95° C. and which is a valuable intermediate for the production of dyestuffs.

8. The compound of the following formula:

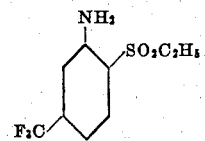

representing a colorless crystallized compound which melts at 42° C. to 43° C. and which is a valuable intermediate for the production of dyestuffs.

KURT SCHIMMELSCHMIDT.
HANS THOMAE.